United States Patent
Coffman

(10) Patent No.: US 11,161,407 B2
(45) Date of Patent: Nov. 2, 2021

(54) CONVERSION KIT FOR FRONT DIFFERENTIAL ON A UTILITY VEHICLE

(71) Applicant: Joseph Coffman, Grain Valley, MO (US)

(72) Inventor: Joseph Coffman, Grain Valley, MO (US)

( * ) Notice: Subject to any disclaimer, the term of this patent is extended or adjusted under 35 U.S.C. 154(b) by 350 days.

(21) Appl. No.: 16/457,340

(22) Filed: Jun. 28, 2019

(65) Prior Publication Data

US 2020/0001707 A1 Jan. 2, 2020

Related U.S. Application Data

(60) Provisional application No. 62/692,240, filed on Jun. 29, 2018.

(51) Int. Cl.

| | |
|---|---|
| *B60K 17/16* | (2006.01) |
| *B62D 21/11* | (2006.01) |
| *F16H 48/38* | (2012.01) |
| *F16H 57/037* | (2012.01) |
| *B62D 21/02* | (2006.01) |
| *B62D 21/18* | (2006.01) |
| *B62D 65/10* | (2006.01) |

(52) U.S. Cl.
CPC .............. *B60K 17/16* (2013.01); *B62D 21/02* (2013.01); *B62D 21/11* (2013.01); *B62D 21/183* (2013.01); *B62D 65/10* (2013.01); *F16H 48/38* (2013.01); *F16H 57/037* (2013.01); *B60Y 2410/10* (2013.01)

(58) Field of Classification Search
CPC ........ B60K 17/16; B62D 21/02; B62D 21/11; B62D 21/183; B62D 65/10; F16H 48/38; F16H 57/037; B60Y 2410/10
USPC ........................................................ 180/354
See application file for complete search history.

(56) References Cited

U.S. PATENT DOCUMENTS

| | | | |
|---|---|---|---|
| 6,357,769 B1 * | 3/2002 | Omundson | B60G 3/24 180/312 |
| 7,938,221 B2 * | 5/2011 | Matsuzaki | B60G 9/02 180/352 |
| 8,402,878 B2 * | 3/2013 | Schreiner | B60G 3/20 89/36.08 |

(Continued)

*Primary Examiner* — Toan C To
(74) *Attorney, Agent, or Firm* — Erickson Kernell IP, LLC; Kent R. Erickson

(57) ABSTRACT

A conversion kit for replacing a bottom-mounted differential with a top-mounted differential using pre-existing mounting features of a vehicle. The kit includes a pair of support members, a pair of mounting gussets, a support plate, and a skid plate. The support members are coupled along top side edges of the top-mounted differential. The support members are coupled to forward and rearward frame members within a differential cavity of a vehicle using the mounting gussets and tabs on the support members and using fasteners installed in pre-existing mounting holes in the vehicle. The top-mounted differential is positioned to maintain substantially the same location and orientation of couplings with a drive train of the vehicle as those used by the bottom-mounted differential. The support plate extends between the support members and optionally supports a winch. The skid plate encloses a clearance opening formed in a pre-existing armor plate of the vehicle.

20 Claims, 11 Drawing Sheets

(56) References Cited

U.S. PATENT DOCUMENTS

| | | | | |
|---|---|---|---|---|
| 8,746,394 B2* | 6/2014 | Kuramoto | ............. | B60K 13/04 |
| | | | | 180/292 |
| 9,045,170 B2* | 6/2015 | Rumpel | ................. | B60G 3/20 |
| 9,221,496 B2* | 12/2015 | Barr | ................... | B62D 21/155 |
| 9,649,924 B2* | 5/2017 | Nakaoka | ............... | B60K 17/10 |
| 10,744,830 B2* | 8/2020 | Hayashi | ................ | B60T 7/102 |
| 2008/0017434 A1* | 1/2008 | Harper | .................. | B60T 1/062 |
| | | | | 180/370 |
| 2009/0091101 A1* | 4/2009 | Leonard | ............... | B62D 61/12 |
| | | | | 280/638 |
| 2012/0326410 A1* | 12/2012 | West | ....................... | B60G 3/20 |
| | | | | 280/124.109 |
| 2013/0093154 A1* | 4/2013 | Cordier | .................. | B60G 3/20 |
| | | | | 280/124.109 |
| 2019/0366834 A1* | 12/2019 | Nagpal | .............. | B60K 7/0007 |

* cited by examiner

CONVERSION KIT FOR FRONT DIFFERENTIAL ON A UTILITY VEHICLE

CROSS-REFERENCE TO RELATED APPLICATIONS

This application claims the benefit of U.S. Provisional Patent Application No. 62/692,240, filed Jun. 29, 2018 the disclosure of which is hereby incorporated herein in its entirety by reference.

BACKGROUND

Side-by-side, off-highway vehicles, also known as UTVs, are very popular as both work and entertainment vehicles. One popular line of UTVs is the RZR line from Polaris Industries, Inc. of Medina, Minn.

As with most commercial products, the RZR line is subject to continuous improvement efforts and updates. Some such updates are easily applied to previous models by those consumers wishing to do so, however, this is not always the case. Owners of prior models are sometimes left with the inability to update and/or remedy known problems and design or component deficiencies in a simple, easy manner. For example, some Polaris RZR models from model years 2014-2018 were manufactured with a front differential that, during use in the field, proved to be inferior and prone to breakdown. A redesigned differential has since replaced the original inferior differential and is provided in new models during manufacture, but the redesigned differential is not readily adaptable to existing models. What is needed is a way to enable consumers to easily replace the original inferior front differential with the new, redesigned front differential in previous models that were manufactured prior to the redesign.

SUMMARY

Exemplary embodiments are defined by the claims below, not this summary. A high-level overview of various aspects thereof is provided here to introduce a selection of concepts that are further described in the Detailed-Description section below. This summary is not intended to identify key features or essential features of the claimed subject matter, nor is it intended to be used in isolation to determine the scope of the claimed subject matter. In brief, this disclosure describes a conversion kit configured to enable replacement of a bottom-mounted front differential in a UTV with a redesigned top-mounted front differential.

The conversion kit includes a pair of longitudinal support members, a pair of mounting gussets, a support plate, and a skid plate. The support members couple to the top-mount front differential. Rear ends of the support members couple to respective frame members of the UTV on a rear side of a differential cavity to rigidly mount the front differential to the frame members. The mounting gussets couple between front ends of the support members and to respective frame members of the UTV along a front side of the differential cavity.

The support plate extends over and between the support members and the top-mount differential and is rigidly coupled to the support members to both reinforce the assembly and to provide a mounting location for an optional winch. The support plate may include an opening configured to enable passage of a winch rope or cable to extend therethrough and outwardly from a front end of the UTV.

The skid plate couples to an existing frame member or an existing armor panel of the UTV to enclose an opening in the existing armor panel that may be formed to provide clearance for the top-mount front differential in the differential cavity.

In use, the conversion kit enables installation of the top-mount front differential in the differential cavity that is configured for a bottom-mount front differential with only minor alteration of the original frame and components of the UTV. The kit also employs fasteners and fastener locations of the original frame and components of the UTV. In one embodiment, the conversion kit is specifically configured for use with models of the RZR line of UTVs from Polaris Industries, Inc. of Medina, Minn. In one embodiment, the conversion kit enables replacement of a front differential provided in RZR 1000, 1000 Highlifter and Turbo models as manufactured by Polaris Industries, Inc. with a front differential model number 1334141 provided in RZR RS1 and Turbo "S" models in model year 2018 by Polaris Industries, Inc. or similarly configured models.

In one embodiment a differential conversion kit for replacing a bottom-mounted differential on a vehicle with a top-mounted differential is described. The kit includes pair of longitudinal support members configured to extend longitudinally relative to a vehicle in which the support members are mountable and between respective forward and rearward frame members that define a differential cavity of the vehicle. The differential cavity is configured for a bottom-mounted differential. Each of the support members includes a transverse bore configured to align with and enable coupling to a mounting bore of a top-mounted differential. The support members also include an upstanding tab extending from a rearward end. The upstanding tabs are configured to abut the respective rearward frame member of the vehicle and include a mounting aperture that is positioned to align with a pre-existing fastener location in the rearward frame member. The kit further includes a mounting gusset extending from a forward end of each support member and coupling the respective support member with the respective forward frame member of the vehicle.

In another embodiment a method for converting a differential in a vehicle from a bottom-mounted differential to a top-mounted differential is described. By the method a pair of longitudinal support members are coupled to respective opposing sides of a top-mounted differential using one or more fasteners installed between the support members and the top-mounted differential. The top-mounted differential includes a mounting bore on each of the respective sides thereof and each of the support members includes a transverse bore configured to align with the respective mounting bore. The top-mounted differential is disposed into a differential cavity of the vehicle and is positioned within differential cavity to provide the same locations and orientations of couplings with a drive train of the vehicle as those provided by the bottom-mounted differential.

An upstanding tab extending from a rearward end of each support member is coupled with a respective rearward frame member provided along a rearward portion of the differential cavity. The upstanding tab is configured to abut the respective rearward frame member and includes a mounting aperture that is positioned to align with a pre-existing fastener location in the rearward frame member. A mounting gusset extending from a forward end of each support member is coupled with a respective forward frame member of the vehicle along a forward portion of the differential cavity.

In another embodiment a method for converting a front differential in a vehicle from a bottom-mounted differential to a top-mounted differential is described. A bottom-mounted differential coupled to the vehicle via one or more fasteners installed between the vehicle and a bottom surface of the bottom-mounted differential is removed from a differential cavity in a vehicle. A pair of longitudinal support members are coupled to respective opposing sides of a top-mounted differential using one or more fasteners installed between the support members and the top-mounted differential. The top-mounted differential includes a pair of mounting bores on each respective side thereof and each of the support members includes a pair of transverse bores configured to align with the respective mounting bores. A portion of an armor plate forming a forward wall of the differential cavity between the forward frame members is removed to form an opening that provides clearance for the top-mounted differential in the differential cavity. A skid plate is coupled to a remaining portion of the armor plate using fasteners installed in pre-existing holes in the armor plate to enclose the opening.

The top-mounted differential is disposed into the differential cavity of the vehicle and is positioned within differential cavity to maintain locations and orientations of couplings used by the bottom-mounted differential with a drive train of the vehicle. An upstanding tab extending from a rearward end of each support member is coupled with a respective rearward frame member provided along a rearward portion of the differential cavity. The upstanding tab is configured to abut the respective rearward frame member and includes a mounting aperture that is positioned to align with a pre-existing fastener location in the rearward frame member. A mounting gusset is coupled between a forward end of each support member and a respective forward frame member of the vehicle. The mounting gusset is coupled to the respective forward frame member by a fastener that extends through a pre-existing opening in the forward frame member and that is shared with a suspension component of the vehicle.

DESCRIPTION OF THE DRAWINGS

Illustrative embodiments are described in detail below with reference to the attached drawing figures, and wherein.

DETAILED DESCRIPTION

The subject matter of select exemplary embodiments is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" or "substantially" as used herein denote deviations from the exact value by +/−10%, preferably by +/−5% and/or deviations in the form of changes that are insignificant to the function.

With reference to FIGS. 1-14, a conversion kit 10 for installation of a top-mount, front differential in a UTV that has been manufactured with a bottom-mount, front differential is described in accordance with an exemplary embodiment. The conversion kit 10 is described and shown herein for use with models in the RZR line provided by Polaris Industries, Inc. of Medina, Minn. However, such is not intended to limit application of embodiments to such vehicles—embodiments of the conversion kit 10 are useable with other models from the same or different manufacturer. Further, the conversion kit 10 is described herein with respect to a front-differential or front gearcase, but embodiments thereof are not so limited. In one embodiment, the conversion kit enables replacement of a front differential provided in RZR 1000, 1000 Highlifter, and Turbo models including the XP and XP4 models from model years 2014-2019 and models XPT and XPT4 from model years 2016-2019 as manufactured by Polaris Industries, Inc. Such models may include a front differential model number 1334141 as provided in RZR RS1 and Turbo "S" models in model year 2018 by Polaris Industries, Inc. or similarly configured models.

Figure 1:
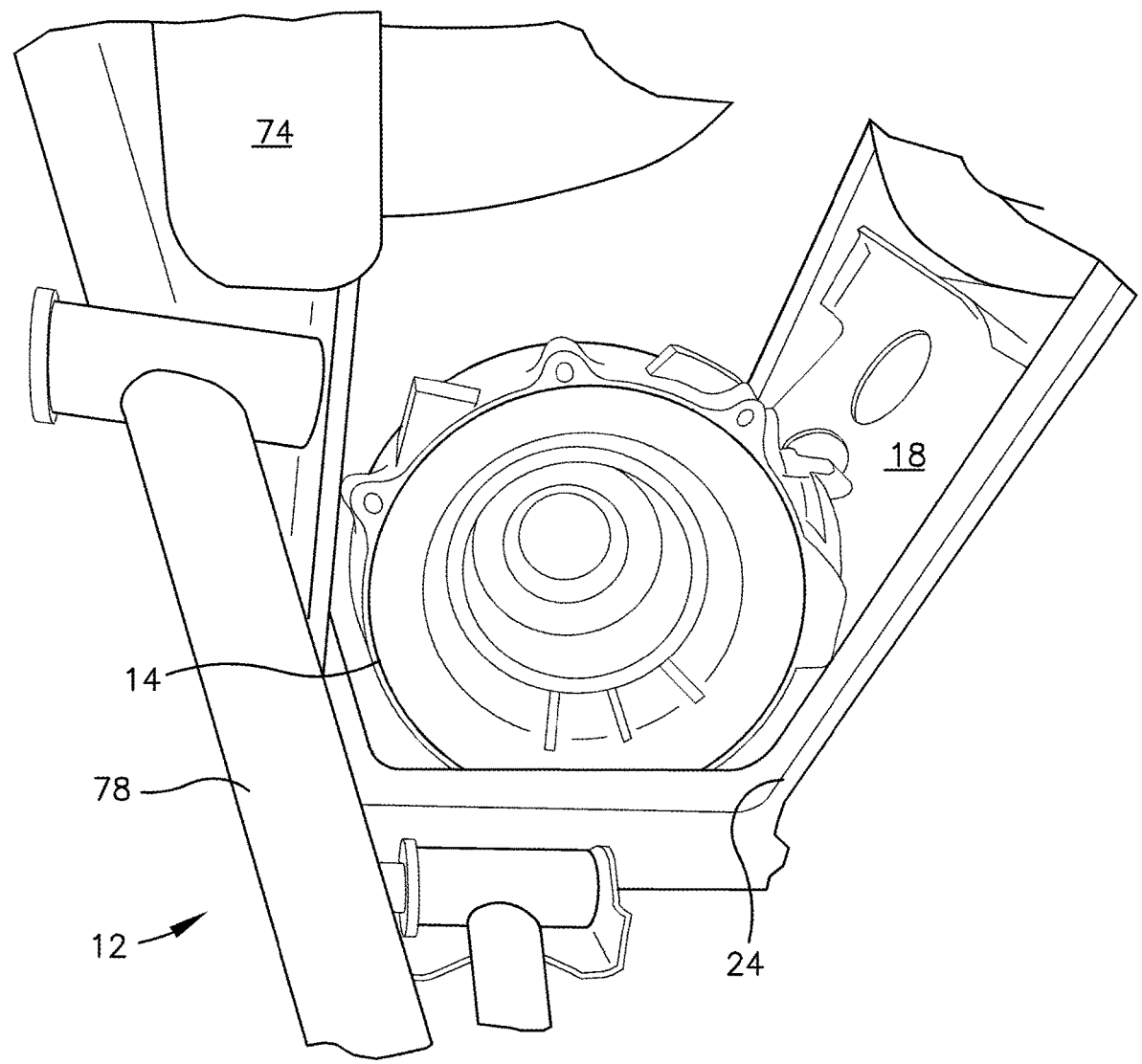
FIG. 1 is a side perspective view of a prior art, pre-existing, bottom-mount, front differential mounted in a differential cavity of a UTV.
Figure 2:
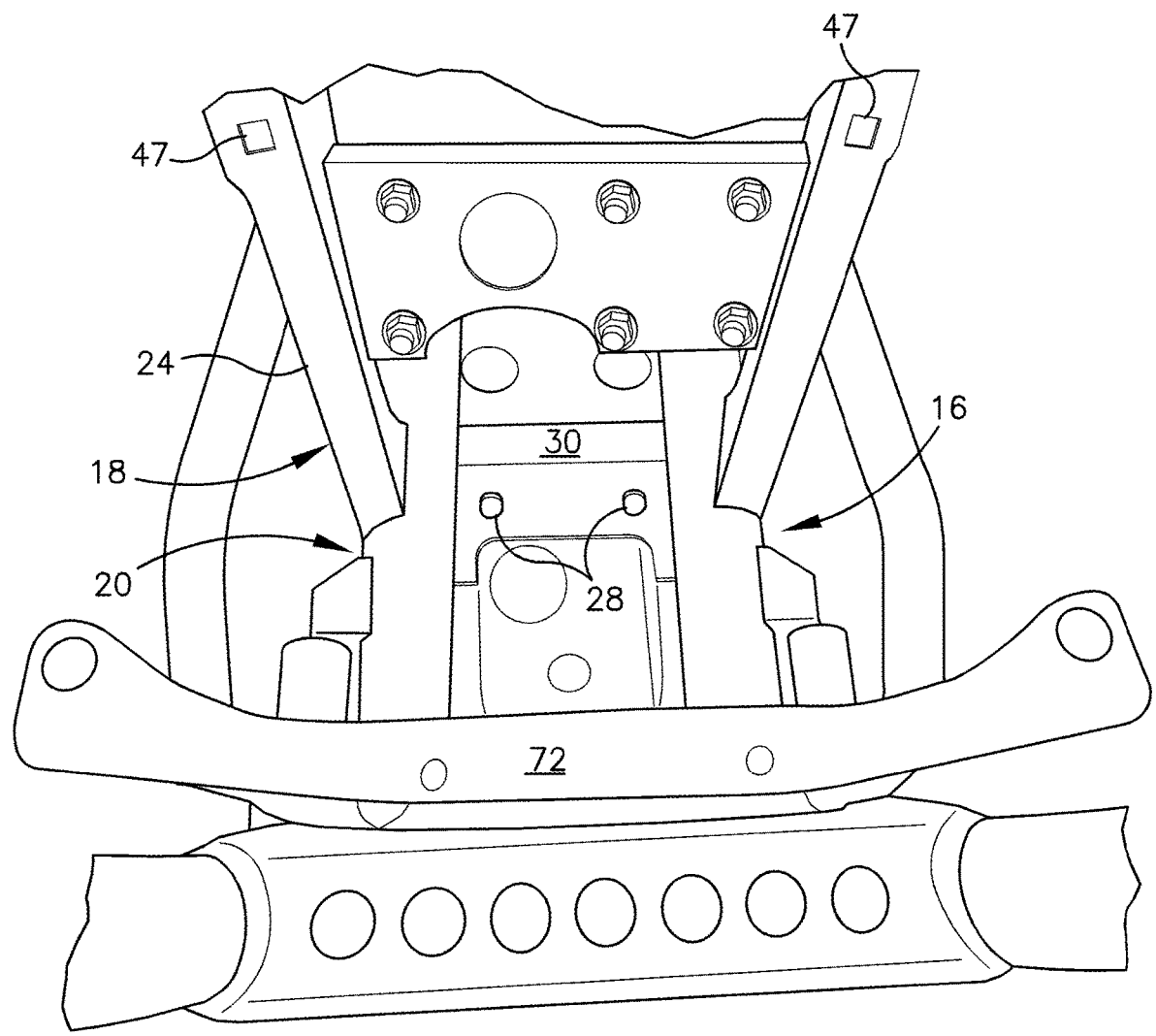
FIG. 2 is a rearward-looking, top, perspective view of the differential cavity of the UTV of FIG. 1 with the pre-existing, bottom-mount, front differential removed and showing a bottom and rear wall thereof.
Figure 3:
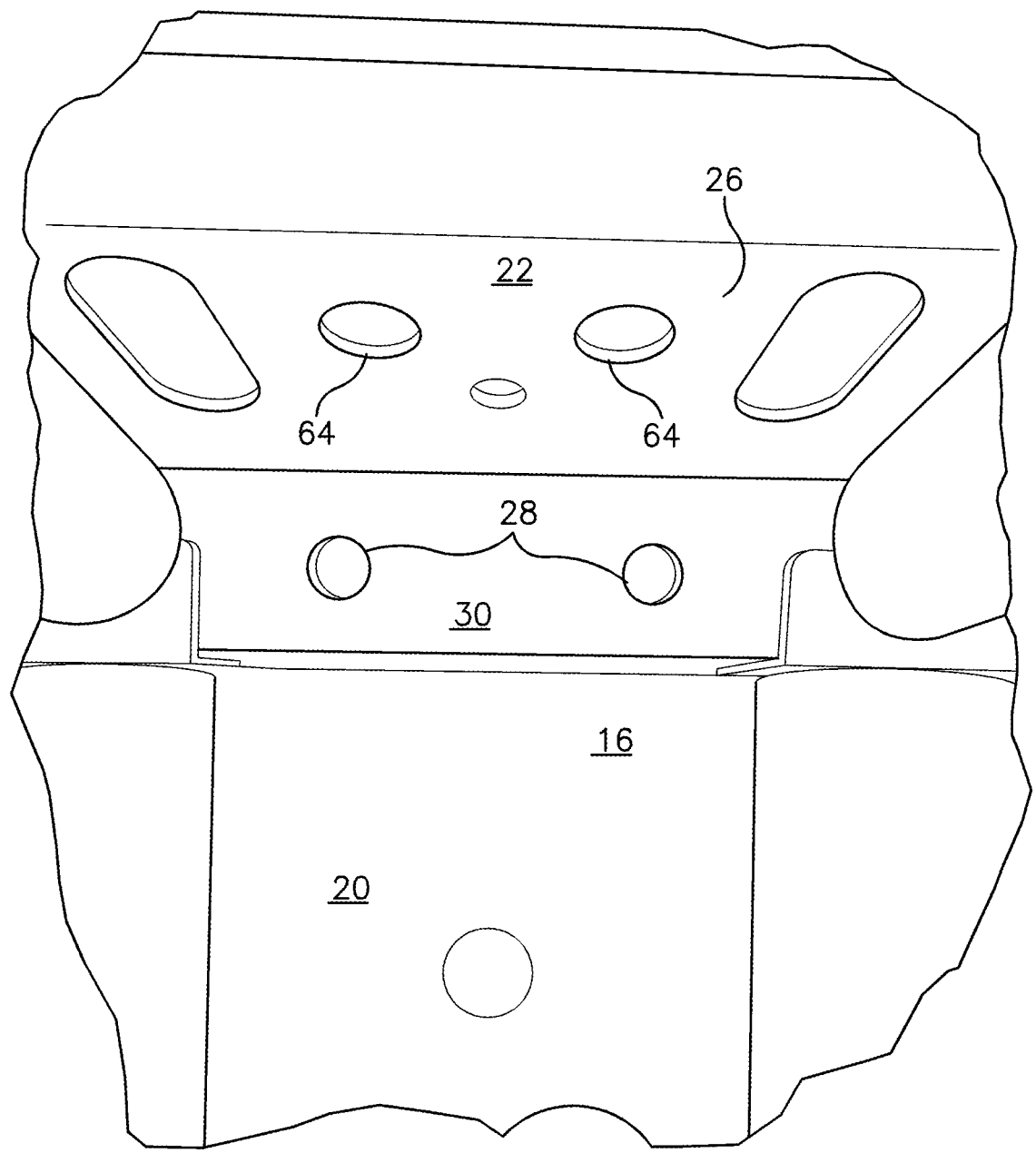
FIG. 3 is a forward-looking, top, perspective view of the differential cavity of the UTV of FIG. 1 with the front differential removed and showing the bottom wall and a front wall thereof.
Figure 4:
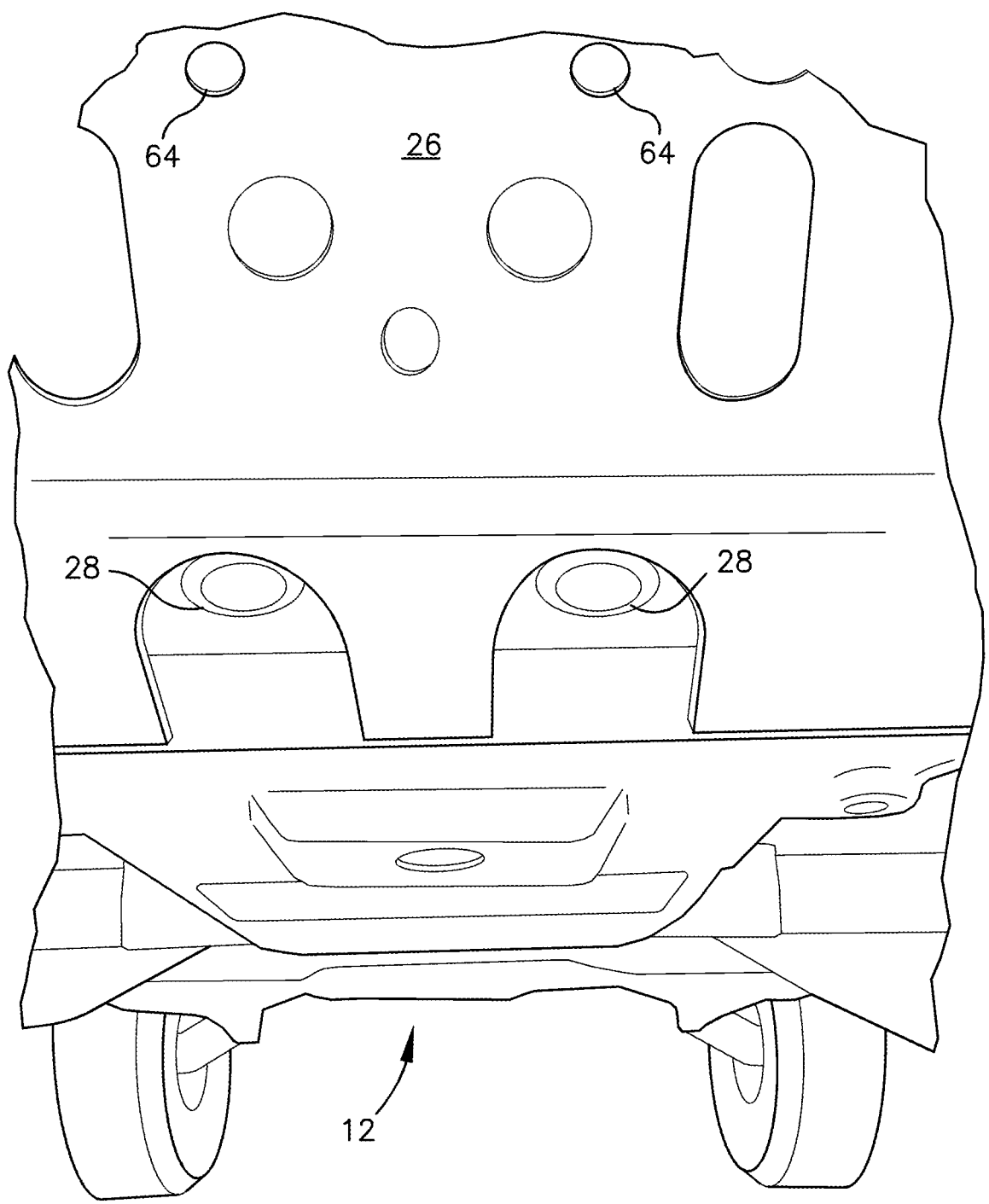
FIG. 4 is a front partial perspective view of an armor plate of the UTV of FIG. 1.

With reference to FIGS. 1-4, a UTV 12 comprising an RZR model from Polaris Industries, Inc. is shown and described. As best shown in FIG. 1, the UTV 12 includes a factory-installed (i.e. pre-existing), bottom-mounted, front differential 14 that is to be replaced using the conversion kit 10. FIGS. 2-4 depict the UTV 12 with the front differential 14 removed to reveal a differential cavity 16 that is defined by a rear wall 18, a bottom wall 20, and a front wall 22. Each of the rear, bottom, and front walls 18, 20, 22 may be formed by one or more components including frame members 24 and one or more armor plates 26. Prior to removal, the pre-existing, front differential 14 is affixed to the UTV 12 via a plurality of fasteners (not shown) disposed through apertures 28 in cross-members 30 extending between the frame members 24 and into a bottom surface of the front differential 14.

Figure 5:
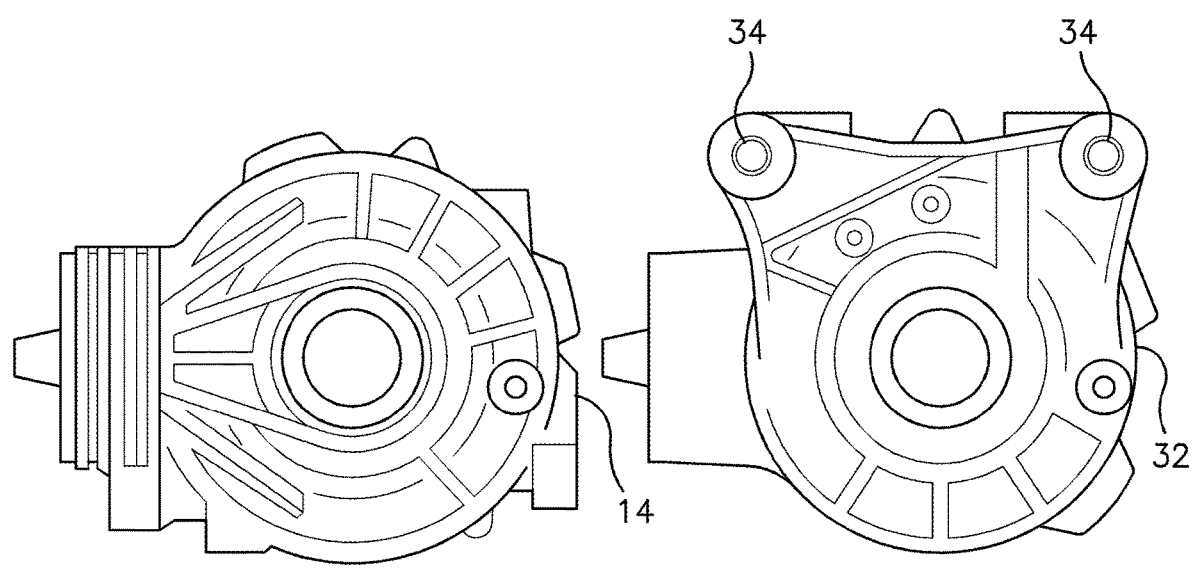
FIG. 5 is a side elevational view of the pre-existing, bottom-mount, front differential of the UTV of FIG. 1 and a top-mount, front differential.

As depicted in FIG. 5, a replacement front differential 32 is configured with a plurality of transverse bores 34 that are positioned along transverse sides and near a top surface of the differential 32 for mounting the differential 32 in a differential cavity of a model of UTV that is different than the UTV 12. This mounting configuration is referred to hereinafter as top-mounted. In other embodiments, the differential 32 may include vertically aligned bores 34 in a top surface thereof. The replacement front differential 32 is preferably superior in one or more characteristics than the differential 14 and thus the consumer is motivated and seeking replacement of the differential 14 with the differential 32.

With additional reference now to FIGS. 6-14, the conversion kit 10 for replacement of the differential 14 with the replacement differential 32 is described in accordance with an exemplary embodiment. The conversion kit 10 includes a pair of longitudinally extending arms or support members 36, a pair of mounting gussets 38, a lateral support member or winch-support plate 40, and a skid plate 42. The longitudinally extending support members 36, the winch-support plate 40 and gussets 38 form a bolt-on differential mounting bracket or assembly 43 that can be connected to existing UTV frame members 24 without having to weld or otherwise connect additional mounting tabs or structure to the existing frame members 24. Similarly, the skid plate 42 is adapted to be connected to the existing armor plate 26 by bolting to existing holes in the armor plate 26.

As depicted in FIGS. 6-7 and 13-14, the support members 36 are sized and configured to extend between the respective frame members 24 forming the front wall 22 and the rear wall 18 of the differential cavity 16 in a generally horizontal orientation. Each support member 36 includes an upstanding tab 44 at a rear end thereof and that extends at an upward angle generally parallel to an associated portion of the respective frame member 24. The tab 44 includes a bore 46 therethrough that is positioned to align with a pre-existing fastener location 47 in the frame member 24. The pre-existing fastener location 47 or other pre-existing feature comprises an aperture, bore, hole, fastener, or other component of the frame member 24 that was present in the UTV 12 upon completion of the original manufacturing process of the UTV 12. Such a pre-existing feature might include a mounting bore or fastener that was originally employed to mount or couple another component to the UTV 12. Pre-existing features do not include those added by a user following manufacturing and/or original sale of the UTV 12 by the manufacturer. In one embodiment, the frame member 24 may be modified to provide a new fastener location that is aligned with the bore 46.

The support members 36 also include a pair of mounting bores 48 that are positioned to align with the transverse bores 34 in the replacement differential 32 and to accept fasteners 50 for affixing the support members 36 to the replacement front differential 32. Blind bores are provided along a top surface of each of the support members 36 to enable coupling of the winch support plate 40 with the support members 36 as described more fully below.

Figure 6:
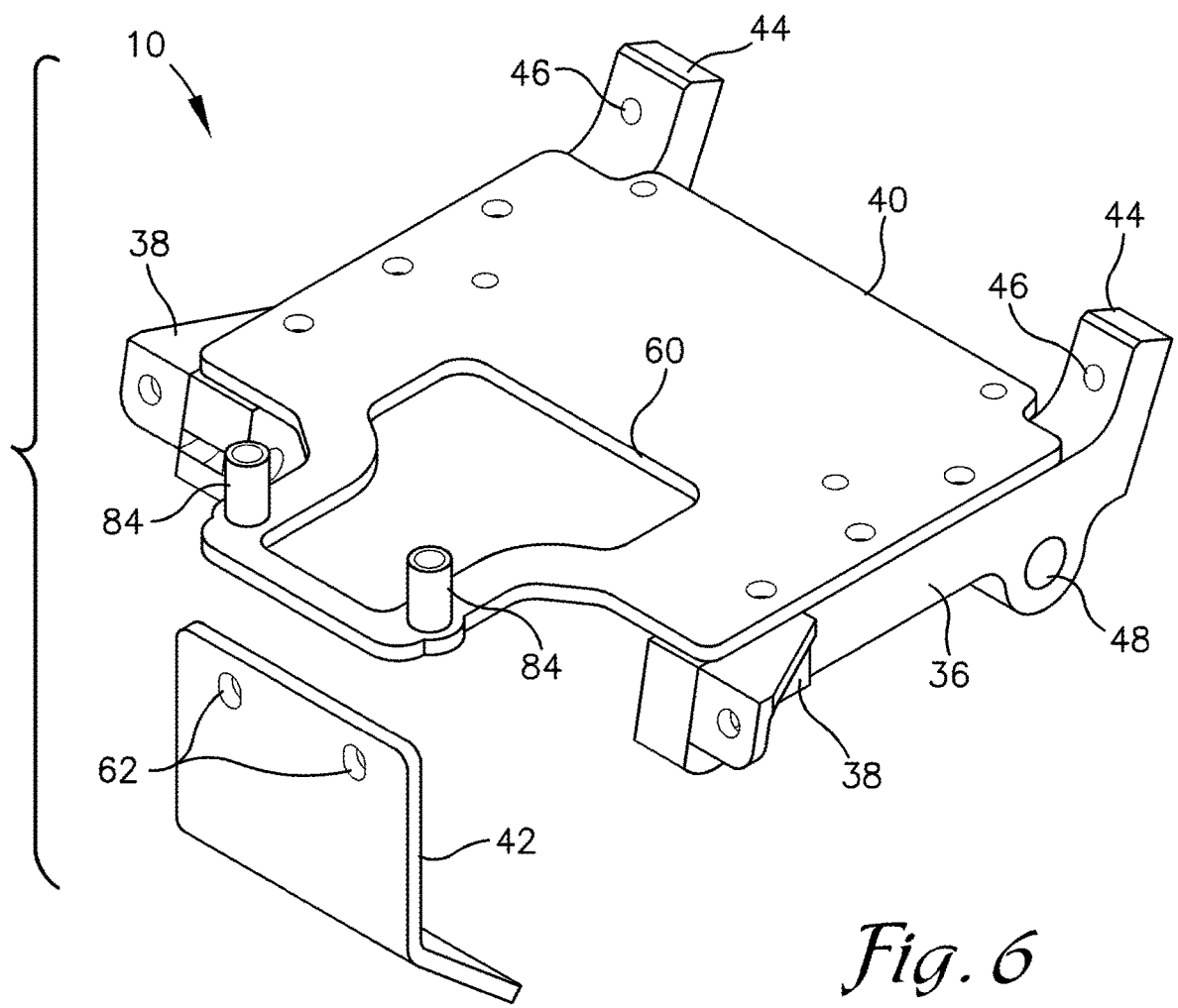
FIG. 6 is a perspective view of a conversion kit for a front differential of a UTV depicted in accordance with an exemplary embodiment.
Figure 7:
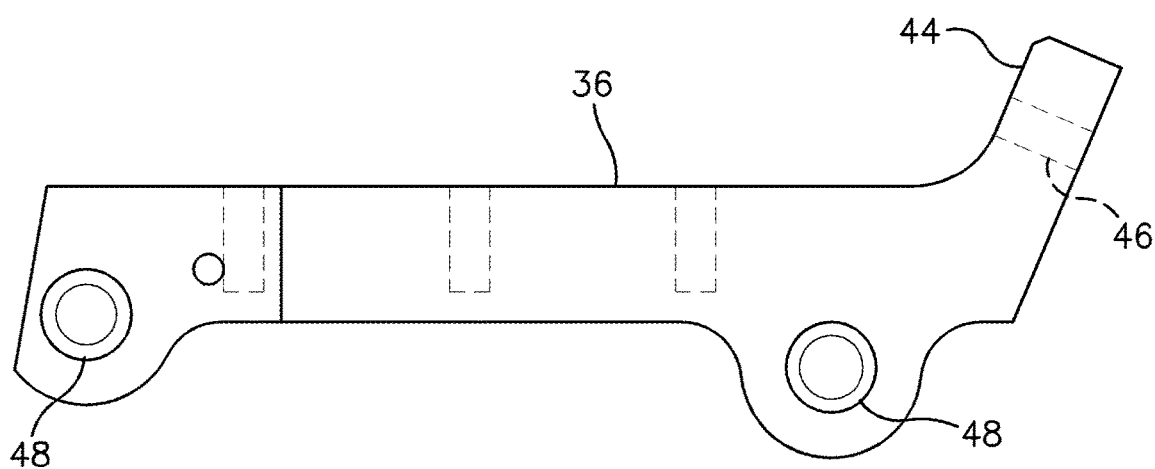
FIG. 7 is a side elevational view of a support member of the conversion kit of FIG. 6.
Figure 8:
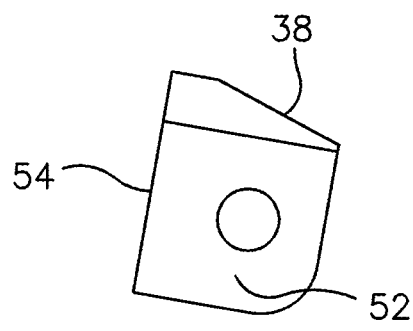
FIG. 8 is an end elevational view of a mounting gusset of the conversion kit of FIG. 6 depicted in accordance with an exemplary embodiment.
Figure 9:
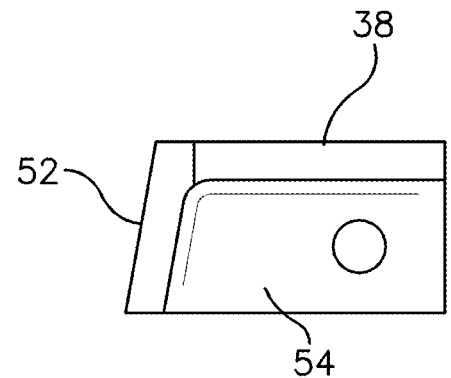
FIG. 9 is a side elevational view of the mounting gusset of FIG. 8.

FIGS. 6, 8, and 9 depict the mounting gussets 38 which are configured to couple the respective support member 36 with the respective frame member 24 and an associated cross-member 51 along the front wall 27 of the differential cavity 26. In the embodiment shown, the cross-members 51 comprise A-arm mounting tabs to which A-arms 78 or other front wheel suspension members are connected to the frame of the UTV 12. Each of the mounting gussets 38 includes a forward wall 52 and a side wall 54 that extend generally orthogonally to one another. The forward wall 52 is configured to couple to the cross-member 51 and/or the frame member 24 of the UTV 12 while the side wall 54 is configured to couple to and abut a side face of the respective support member 36.

Figure 10:
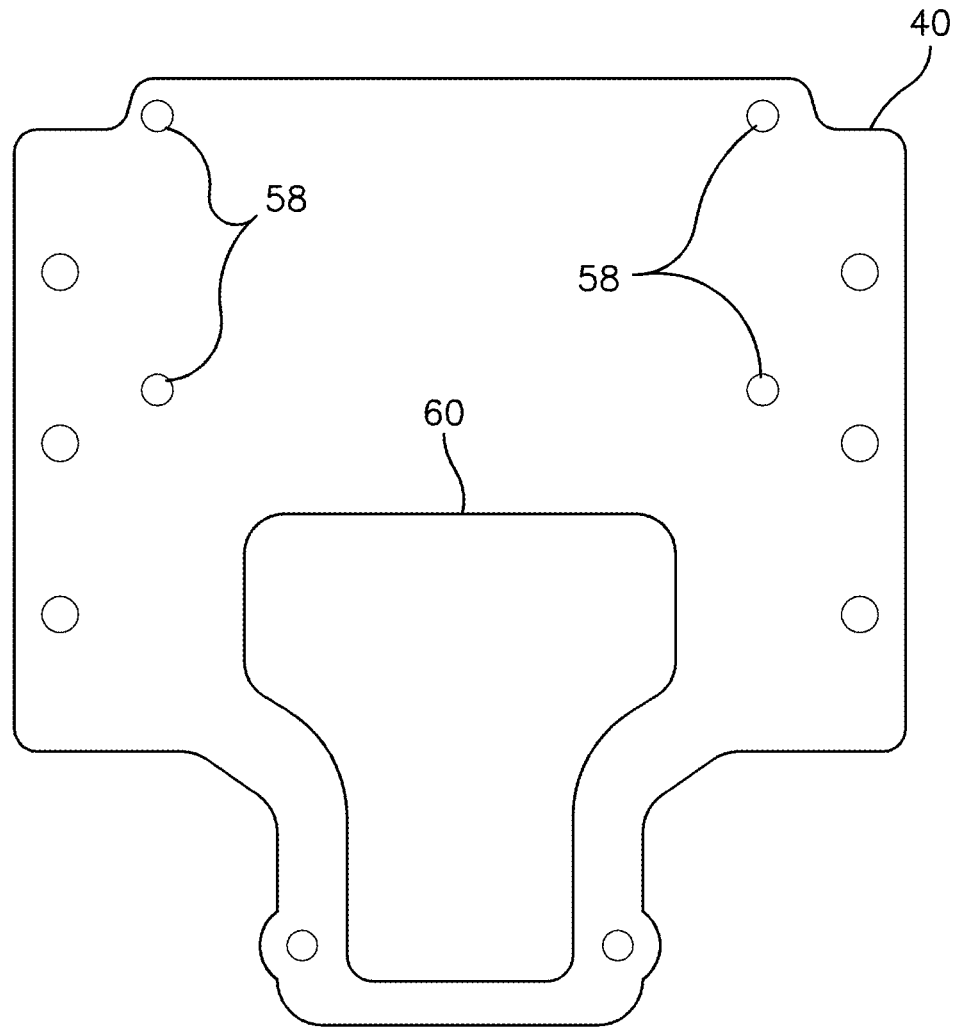
FIG. 10 is a top plan view of a support plate of the conversion kit of FIG. 6 depicted in accordance with an exemplary embodiment.
Figure 14:
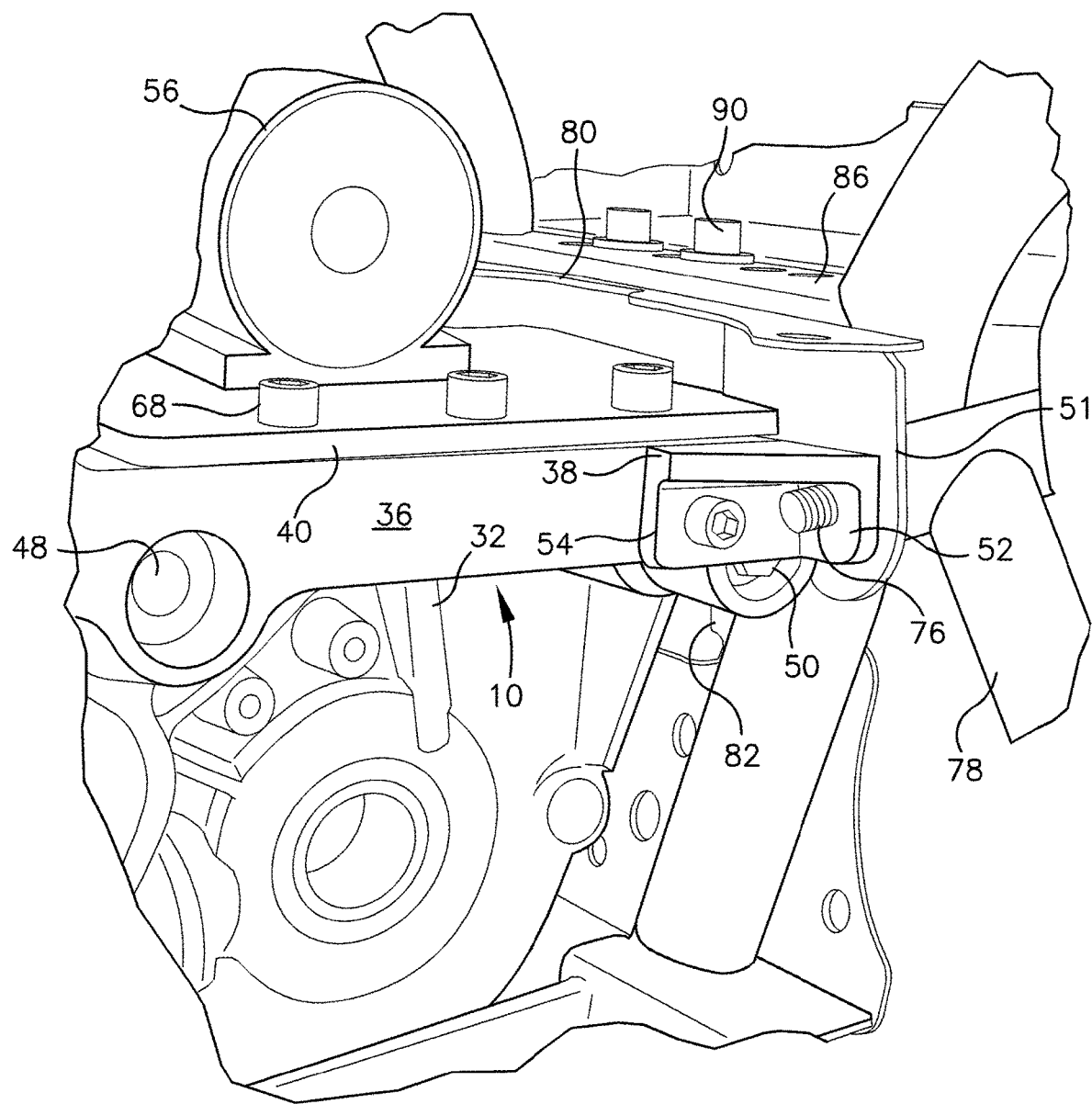
FIG. 14 is a side perspective view of the installation depicted in FIG. 13 with the support plate and a winch installed on the support members of the conversion kit in accordance with an exemplary embodiment.

As depicted in FIGS. 6, 10, and 14 the winch support plate 40 comprises a planar member that is sized and configured to couple to and extend between the support members 36. The winch-support plate 40 provides lateral support for the mounting assembly and a mounting location for a winch 56 along with associated apertures 58 to aid such mounting. The winch-support plate 40 may also include an opening 60 configured to allow passage of a winch rope or cable from the winch 56 outwardly from a front end of the UTV 12.

A pair of bushings 84 is provided near a front edge of the winch-support plate 40. The bushings 84 are configured to align with apertures 88 in a cross-member channel 86 of the frame of the UTV 12 and to receive fasteners 90 for coupling with the cross-member channel 86. The bushings 84 enable tightening of the fasteners 90 for coupling of the winch-support plate 40 with the cross-member channel 86 without crushing the channel shape of the cross-member channel 86.

The skid plate 42 comprises a plate that is formed to follow contours of the armor plate 26 of the UTV 12 and sized to cover an opening in the armor plate 26 that is formed to enable installation of the replacement differential 32 as described below. The skid plate 42 preferably includes apertures 62 that are positioned to align with pre-existing openings 64 in the armor plate 26 to enable the skid plate 42 to be affixed thereto via fasteners 66.

With continued reference to FIGS. 1-14, installation of the replacement front differential 32 using the conversion kit 10 is described in accordance with an exemplary embodiment. As depicted in FIG. 1, a front cowling of the UTV 12 is first removed to expose components of the UTV drive train, suspension, and cooling system, among others. These components are disassembled and/or removed by methods known in the art to provide access to the front differential 14 and to disconnect the front differential 14 from the drive train of the UTV 12. The differential 14 is decoupled from the UTV 12 by removing the fasteners from the bottom side of the differential 14 and then removed from the differential cavity 16.

Figure 11:
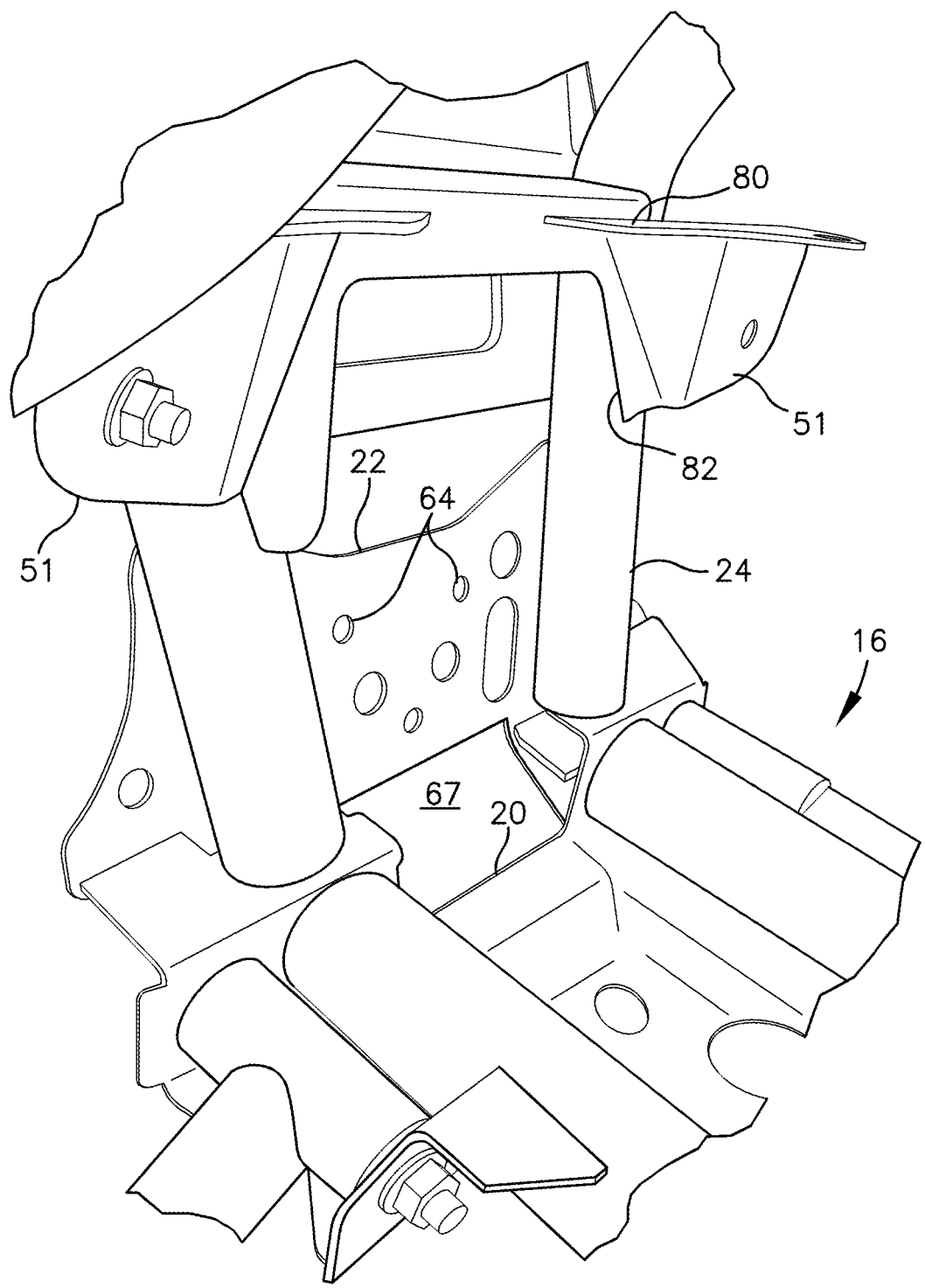
FIG. 11 is a perspective, side view of the differential cavity of the UTV of FIG. 1 with a clearance opening formed in a forward armor plate thereof in accordance with an exemplary embodiment.
Figure 12:
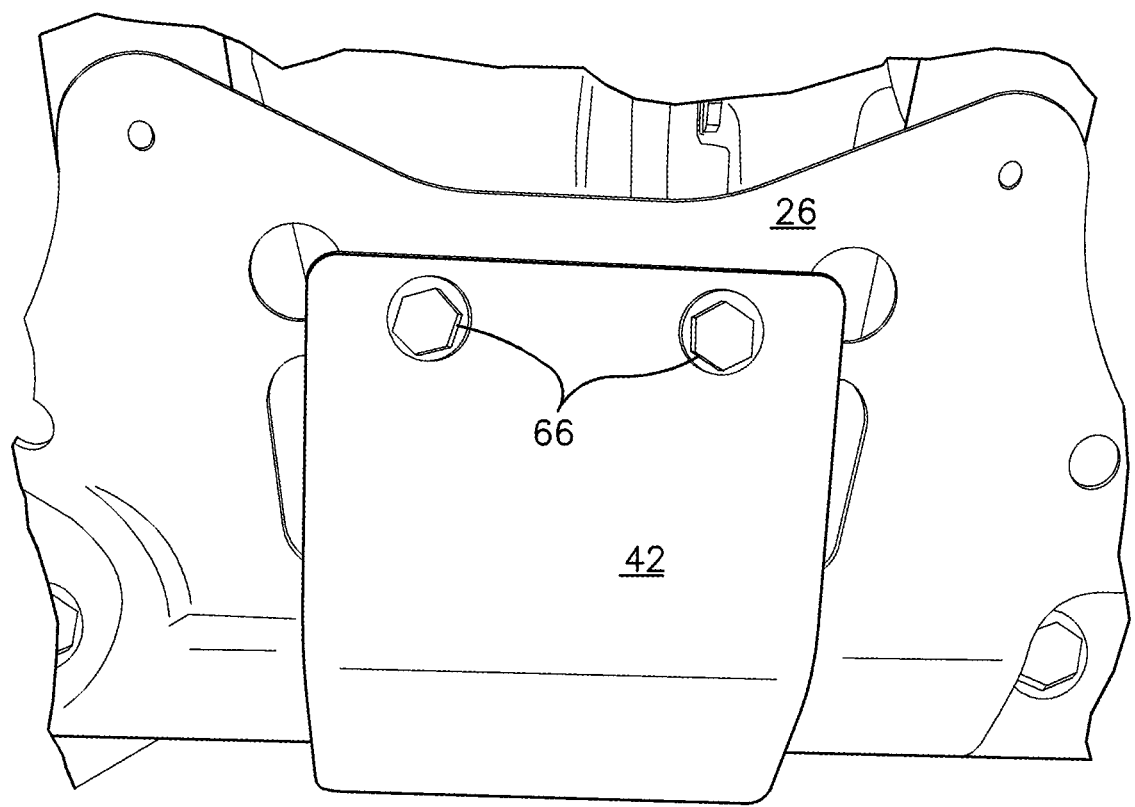
FIG. 12 is a front partial perspective view of the armor plate of FIG. 11 with a skid plate of the conversion kit installed thereon in accordance with an exemplary embodiment.
Figure 13:
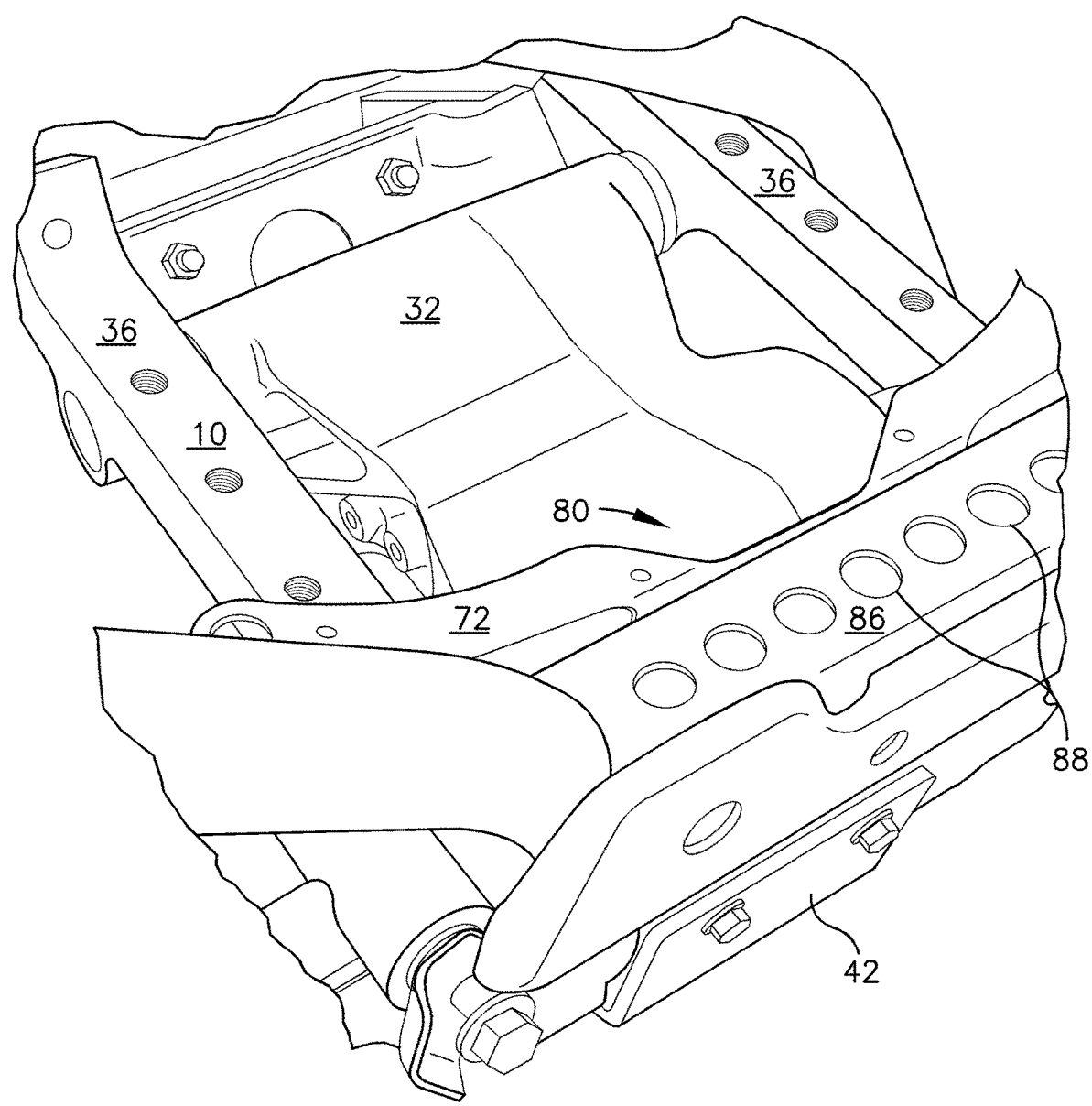
FIG. 13 is a top perspective view of the differential cavity of FIG. 11 with the top-mount front differential disposed therein and with the support members of the conversion kit installed thereon depicted in accordance with an exemplary embodiment.

In some embodiments, the differential cavity 16 must be enlarged in some areas to provide sufficient clearance for installation of the replacement front differential 32. For example, a portion 67 of the armor plate 26 may be cut away to provide additional clearance along the front wall 22 of the differential cavity 16, as depicted in FIG. 11. The skid plate 42 is installed on the armor plate 26 to cover the missing portion 67 thereof preferably by installing the fasteners 66 through the pre-existing openings 64 in the armor plate 26.

The support members 36 are affixed to the replacement front differential 32 by installing fasteners 50 through the mounting bores 48 and into the transverse bores 34 in the differential 32. The transverse bores 34 may extend through the body of the differential 32 to allow a single fastener 50 to extend through one support member 36, through a body of the differential 32, and through the opposite support member 36 to enable a nut or similar component to be installed on a distal end of the fastener 50. Or the transverse bores 48 may include interior threads that are engageable by the fasteners 50.

The mounting gussets 38 are coupled to the respective support members 36 via fasteners installed through the side walls 54 of the gussets 38 and into the support members 36. The forward walls 52 of the mounting gussets 38 are coupled to the cross-member 51 forming a portion of the front wall 22 of the differential cavity 16 and the tabs 44 on the support members 36 are coupled to the frame members 24 forming the rear wall 18 of the differential cavity 16. These couplings are preferably formed using pre-existing apertures in the cross-member 51 and the frame members 24 or associated portions of the UTV 12, or new apertures may be formed. In one embodiment, depicted in FIG. 14, the front walls 52 of the mounting gussets 38 are secured to the A-arm mounting tabs 78 using the fastener 76 employed to couple the A-arm 78 or other front wheel suspension member to the frame of the UTV 12. Bolting the front wall 52 of each gusset 38 against a respective A-arm mounting tab 78 also provides additional support for the A-arm mounting tabs 78 which will significantly reduce the likelihood of failure of the connection of the A-arms to the frame.

The winch-support plate 40 is affixed to the support members 24 via a plurality of fasteners 68 disposed therebetween. The winch-support plate 40 may reinforce the support members 24 and the overall assembly. When desired the winch 56 may be coupled to the winch-support plate 40 using provided apertures in the winch-support plate 40 and associated fasteners. The winch rope or cable is fed through the opening 60 in the winch-support plate 40 and through a fairlead or other opening in a front end of the UTV 12.

A wiring adaptor may be provided to adapt a wiring connector of the replacement front differential 32 with an existing wiring connector of the UTV 12. The replacement front differential 32 may include a wiring coupler that is the same or different than the differential 14 being replaced. As such, the wiring adaptor may be employed to adapt an existing coupler of the UTV 12 with a different coupler of the replacement front differential 32, or the wiring adaptor may be employed to provide additional length of wiring in the UTV 12 for coupling with the replacement front differential 32.

The conversion kit 10 is configured to provide proper positioning and orientation (e.g. pinion angles) of the replacement front differential 32 for connection with a drive train of the UTV 12 which may include a drive shaft as well as axles of the front wheels among other components. In one embodiment, the position and orientation of these couplings for the top-mounted replacement differential 32 are substantially the same as those provided by the bottom-mounted differential 14.

The configuration also enables reinstallation of other components of the UTV 12 using the existing original (OEM) equipment and without further customization being required. For example, a pre-existing mounting bracket for a radiator may be employed to mount the radiator without need for additional new components or difficult reconfiguration of the bracket. In one embodiment depicted best in FIG. 13, the radiator mounting flange 72 is notched at 80 to provide additional clearance for the replacement front differential 32. Additional components of the frame of the UTV 12 may also be removed, notched, or otherwise modified to allow installation of the replacement front differential 32. For example, a cross-bar support member may be removed from a location 82 as depicted in FIG. 11. The conversion kit 10 is designed to allow any such modifications to be completed simply with common tools and by means common to those of skill in the art.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A differential conversion kit for replacing a bottom-mounted differential on a vehicle with a top-mounted differential, the kit comprising:
    a pair of longitudinal support members configured to extend longitudinally relative to a vehicle in which the support members are mountable and between respective forward and rearward frame members that define a differential cavity of the vehicle, the differential cavity being configured for a bottom-mounted differential, each of the support members including a transverse bore configured to align with and enable coupling to a mounting bore of a top-mounted differential;
    an upstanding tab extending from a rearward end of each support member, the upstanding tab being configured to abut the respective rearward frame member of the vehicle and including a mounting aperture that is positioned to align with a pre-existing fastener location in the rearward frame member; and
    a mounting gusset extending from a forward end of each support member, the mounting gusset coupling the respective support member with the respective forward frame member of the vehicle.

2. The differential conversion kit of claim 1, further comprising:
    a support plate coupled to and extending transversely between the pair of longitudinal support members.

3. The differential conversion kit of claim 2, wherein the support plate is configured to couple to and support a winch, and wherein the support plate includes an opening through which a winch cable is extendable from the winch to be accessible from outside the vehicle.

4. The differential conversion kit of claim 2, further comprising:
    a pair of bushings disposed along a forward portion of the support plate, the bushings each configured to align with a respective pre-existing hole in a cross-member of the vehicle that extends between the forward frame members and to receive a fastener disposed through each of the respective pre-existing holes in the cross-member.

5. The differential conversion kit of claim 1, further comprising:
a skid-plate that is couplable to a pre-existing armor plate of the vehicle using fasteners disposed through pre-existing holes in the pre-existing armor plate, and the skid plate being configured to cover an opening that is formed in the pre-existing armor plate to provide clearance for the top-mounted differential within the differential cavity.

6. The differential conversion kit of claim 1, wherein the mounting gussets comprise generally L-shaped components that couple between forward ends of the respective support members and the respective forward frame members.

7. The differential conversion kit of claim 1, wherein the mounting gussets are coupled to the respective forward frame members using a fastener that is shared with a suspension component of the vehicle.

8. The differential conversion kit of claim 1, wherein the vehicle comprises a UTV.

9. The differential conversion kit of claim 8, wherein the vehicle comprises an RZR model UTV from Polaris Industries, Inc.

10. The differential conversion kit of claim 1, wherein the top-mounted differential comprises a front differential.

11. The differential conversion kit of claim 1, wherein the support members position the top-mounted differential within the differential cavity in a position that maintains locations and orientations of couplings with a drive train of the vehicle used by the bottom-mounted differential.

12. A method for converting a differential in a vehicle from a bottom-mounted differential to a top-mounted differential, the method comprising:
coupling a pair of longitudinal support members to respective opposing sides of a top-mounted differential using one or more fasteners installed between the support members and the top-mounted differential, the top-mounted differential including a mounting bore on each of the respective sides thereof, each of the support members including a transverse bore configured to align with the respective mounting bore;
disposing the top-mounted differential into a differential cavity of the vehicle, the differential cavity being configured to receive a pre-existing bottom-mounted differential, the top-mounted differential being positioned within differential cavity to provide the same locations and orientations of couplings with a drive train of the vehicle as those provided by the pre-existing bottom-mounted differential;
coupling an upstanding tab extending from a rearward end of each support member with a respective rearward frame member provided along a rearward portion of the differential cavity, the upstanding tab being configured to abut the respective rearward frame member and including a mounting aperture that is positioned to align with a pre-existing fastener location in the rearward frame member; and
coupling a mounting gusset extending from a forward end of each support member with a respective forward frame member of the vehicle along a forward portion of the differential cavity.

13. The method of claim 12, further comprising:
removing the pre-existing bottom-mounted differential from the differential cavity in the vehicle, the pre-existing bottom-mounted differential being coupled to the vehicle via one or more fasteners installed between the vehicle and a bottom surface of the pre-existing bottom-mounted differential.

14. The method of claim 12, further comprising:
coupling a support plate between the support members, the support plate overlying the top-mounted differential.

15. The method of claim 14, further comprising:
disposing a winch on the support plate; and
extending a winch cable from the winch through an opening in the support plate and outward from a front portion of the vehicle.

16. The method of claim 12, further comprising:
removing a portion of an armor plate forming a forward wall of the differential cavity between the forward frame members to form an opening that provides clearance for the top-mounted differential in the differential cavity; and
coupling a skid plate to a remaining portion of the armor plate using fasteners installed in pre-existing holes in the armor plate, the skid plate enclosing the opening.

17. The method of claim 12, wherein coupling the mounting gusset with the respective forward frame member of the vehicle further comprises:
installing a fastener through a suspension component of the vehicle, through a pre-existing mounting hole in the respective forward frame member, and through the respective mounting gusset.

18. A method for converting a front differential in a vehicle from a bottom-mounted differential to a top-mounted differential, the method comprising:
removing a pre-existing bottom-mounted differential from a differential cavity in a vehicle, the pre-existing bottom-mounted differential being coupled to the vehicle via one or more fasteners installed between the vehicle and a bottom surface of the pre-existing bottom-mounted differential;
coupling a pair of longitudinal support members to respective opposing sides of a top-mounted differential using one or more fasteners installed between the support members and the top-mounted differential, the top-mounted differential including a pair of mounting bores on each respective side thereof, each of the support members including a pair of transverse bores configured to align with the respective mounting bores;
removing a portion of an armor plate forming a forward wall of the differential cavity between the forward frame members to form an opening that provides clearance for the top-mounted differential in the differential cavity;
coupling a skid plate to a remaining portion of the armor plate using fasteners installed in pre-existing holes in the armor plate, the skid plate enclosing the opening;
disposing the top-mounted differential into the differential cavity of the vehicle, the top-mounted differential being positioned within differential cavity to maintain locations and orientations of couplings of the pre-existing bottom-mounted differential with a drive train of the vehicle;
coupling an upstanding tab extending from a rearward end of each support member with a respective rearward frame member provided along a rearward portion of the differential cavity, the upstanding tab being configured to abut the respective rearward frame member and including a mounting aperture that is positioned to align with a pre-existing fastener location in the rearward frame member;

coupling a mounting gusset between a forward end of each support member and a respective forward frame member of the vehicle, the forward frame member forming a forward portion of the differential cavity, the mounting gusset being coupled to the respective forward frame member by a fastener that extends through a pre-existing opening in the forward frame member and that is shared with a suspension component of the vehicle.

19. The method of claim 18, further comprising:
coupling a support plate between the support members, the support plate overlying the top-mounted differential and providing a mounting location for a winch.

20. The method of claim 19, further comprising:
providing a kit that includes the pair of longitudinal support members, the mounting gussets, the skid plate, and the support plate.

* * * * *